United States Patent
Hashimoto et al.

[11] Patent Number: 5,934,247
[45] Date of Patent: Aug. 10, 1999

[54] ENGINE DECELERATION CONTROL DEVICE

[75] Inventors: Masahiko Hashimoto, Isehara; Naoki Osada, Sagamihara, both of Japan

[73] Assignee: Nissan Motor Co., Ltd., Kanagawa, Japan

[21] Appl. No.: 09/150,209

[22] Filed: Sep. 9, 1998

[30] Foreign Application Priority Data

Sep. 10, 1997 [JP] Japan .................................. 9-245488
Jun. 9, 1998 [JP] Japan .................................. 10-161056

[51] Int. Cl.⁶ ........................... F02M 23/06; F02D 41/12
[52] U.S. Cl. ........................ 123/327; 123/329; 123/493; 123/406.5
[58] Field of Search ..................................... 123/327, 329, 123/406.5, 492, 493, 585; 60/284

[56] References Cited

U.S. PATENT DOCUMENTS 5,213,076  5/1993  Umemoto et al. ....................... 123/585
5,535,586  7/1996  Ohata et al. ............................... 60/284
5,797,370  8/1998  Kimura et al. ........................... 123/492

FOREIGN PATENT DOCUMENTS 6-288327  10/1994  Japan .

*Primary Examiner*—Tony M. Argenbright
*Assistant Examiner*—Mahmoud M. Gimie
*Attorney, Agent, or Firm*—McDermott, Will & Emery

[57] ABSTRACT

Undershoot of rotation speed is prevented by increasing an intake air amount of an engine when it decelerates. Precise control corresponding to differences of a deceleration state is realized by setting an increase amount of intake air to a different value according to the engine rotation speed and deceleration. Preferably, increasing of intake air amount starts when the engine rotation speed reaches a first predetermined value. It is terminated when the engine rotation speed reaches a second predetermined value smaller than the first predetermined value or when a predetermined time has elapsed, whichever is the sooner.

11 Claims, 5 Drawing Sheets

ENGINE DECELERATION CONTROL DEVICE

The contents of Tokugan Hei 9-245488, with a filing date of Sep. 10, 1997 and Tokugan Hei 10-161056, with a filing date of Jun. 9, 1998 in Japan, are hereby incorporated by reference.

FIELD OF THE INVENTION

This invention relates to control of an engine in deceleration.

BACKGROUND OF INVENTION

When a gasoline engine decelerates, if there is undershoot of rotation speed, an engine stall or rotational fluctuation of the engine is apt to occur. In order to suppress such an undershoot of rotation speed during deceleration, Tokkai Hei 6-288327 published by the Japanese Patent Office in 1994 discloses a method of correcting an intake air quantity and ignition timing of the engine during deceleration.

According to this prior art, fuel supply is cut during engine deceleration, and when the engine rotation speed has reached a predetermined value in the vicinity of the idle rotation speed, the fuel supply resumes and the engine then rotates at the idle rotation speed. When the fuel supply resumes, the air supply amount to the engine is increased by a constant amount. In addition, an ignition timing is corrected according to a difference between a target rotation speed and a real rotation speed of the engine.

However, the engine deceleration state may be gradual deceleration or sudden deceleration, i.e. it is not constant. Moreover, an intake negative pressure in the intake manifold when the engine decelerates to the idle state is also different according to the engine rotation speed before deceleration, deceleration rate and air supply amount during deceleration, etc.

Simply increasing the air volume by a constant amount is therefore not always sufficient to effectively suppress the rotational fluctuation of the engine rotation speed, even when it is accompanied by the ignition timing control.

SUMMARY OF THE INVENTION

It is therefore an object of this invention to optimize the control of the rotational fluctuation due to deceleration of an engine when the engine decelerates to an idle state.

In order to achieve the above object, this invention provides a device for controlling an engine in a deceleration state, comprising a valve for increasing or decreasing an engine intake air amount, a sensor for detecting an engine rotation speed, and a microprocessor programmed to calculate a deceleration of the engine from the engine rotation speed, set an opening increase correction amount of the valve according to the engine rotation speed and the engine deceleration, and perform a correction of an opening of the valve based on the increase correction amount.

It is preferable that the microprocessor is further programmed to set the increase correction amount to be larger the larger the deceleration.

It is also preferable that the microprocessor is further programmed to start the correction of the valve opening when the engine rotation speed is equal to or less than a first predetermined rotation speed.

In this case, it is further preferable that the microprocessor is further programmed to terminate the correction of the valve opening when the engine rotation speed has decreased to a second predetermined rotation speed which is less than the first predetermination rotation speed, or when a predetermined time has elapsed from when the correction of the valve opening was started, whichever timing is the sooner.

In this case, it is still further preferable that the microprocessor is further programmed to set the predetermined time to be longer the larger the deceleration.

It is also preferable that the microprocessor is further programmed to set the first predetermined rotation speed to a larger value the larger the deceleration.

When the engine comprises a spark plug for igniting a fuel-air mixture, it is preferable that the microprocessor is further programmed to advance an ignition timing of the spark plug in response to the correction of the valve opening.

In this case, it is further preferable that the microprocessor is further programmed to set an advance amount of the ignition timing to be larger, the larger the deceleration.

It is also preferable that the microprocessor is further programmed to decrease an advance amount of the ignition timing as the engine rotation speed decreases.

The valve in the device may comprise an auxiliary air valve which bypasses a throttle of the engine, or an electronically controlled throttle.

The details as well as other features and advantages of this invention are set forth in the remainder of the specification and are shown in the accompanying drawings.

DESCRIPTION OF THE PREFERRED EMBODIMENTS

Figure 1:
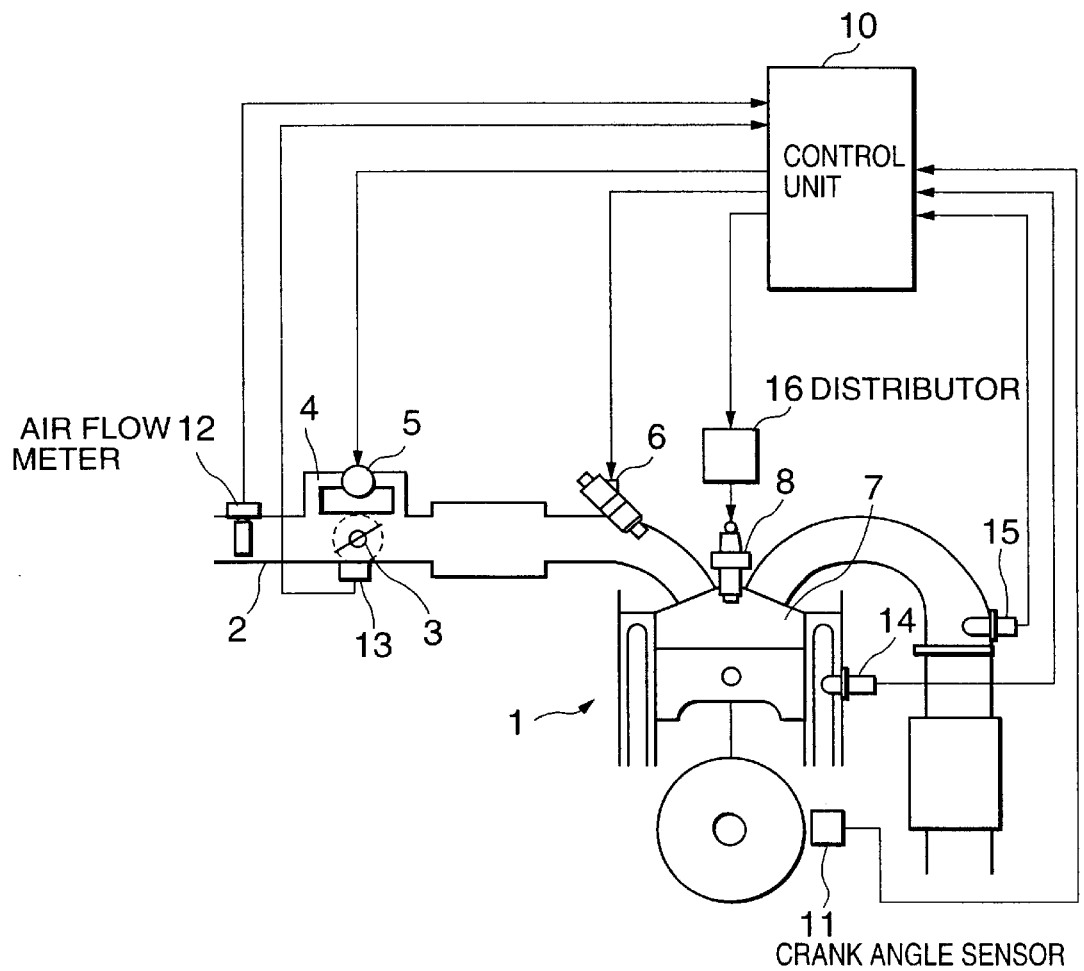
FIG. 1 is a schematic diagram of an engine deceleration control device according to this invention.

Referring to FIG. 1 of the drawings, a throttle 3 and an auxiliary air passage 4 which bypasses the throttle 3 are provided in an intake passage 2 of a multi-cylinder gasoline engine 1 for a vehicle.

An auxiliary air-valve 5 for idle speed control is interposed in the auxiliary air passage 4. The auxiliary air valve 5 may be a proportional solenoid type valve that responds to a duty signal which varies an ON time proportion in a fixed time period and increases its opening with increase of a duty ratio.

The valve may also be a step motor type valve which is driven by a step motor that increases or decreases the opening of the valve in response to a signal input at a fixed interval.

An electromagnetic fuel injector 6 which injects fuel into the intake air is installed in the intake passage 2 for each cylinder.

The fuel injected from the fuel injector 6 into the intake air is aspirated together with air as an air-fuel mixture into a combustion chamber 7 of the engine 1.

A spark plug 8 is installed in the combustion chamber 7 for igniting the fuel-air mixture. The spark plug 8 ignites by an ignition current distributed via a distributor 16.

The action of the auxiliary air valve 5, fuel injector 6, and spark plug 8 is controlled by a control unit 10.

The control unit 10 comprises a microcomputer comprising a central operating unit (CPU), read-only memory (ROM), random-access memory (RAM), and input/output interface (I/O interface).

A signal is input to the control unit 10 from a crank angle sensor 11 which outputs a signal at each rotation through a predetermination crank angle of the engine 1. Based on this signal, the control unit 10 detects an angular position of the engine 1 and a rotation speed Ne.

Detection signals are also input to the control unit 10 from an air flow meter 12 which detects an intake air flow rate Qa of the intake passage 2, a throttle sensor 13 which detects an opening TVO of a throttle 3, a water temperature sensor 14 which detects an engine cooling water temperature Tw, and an oxygen sensor 15 which detects whether the air-fuel ratio of the air-fuel mixture supplied to the engine 1 is rich or lean from the oxygen concentration of the exhaust.

Based on these input signals, during a predetermined deceleration of the engine 1, the control unit 10 corrects the opening of the auxiliary air valve 5 and ignition timing of the spark plug 8.

Next, the above control process performed by the control unit 10 will be described referring to FIGS. 2–4.

Figure 2:
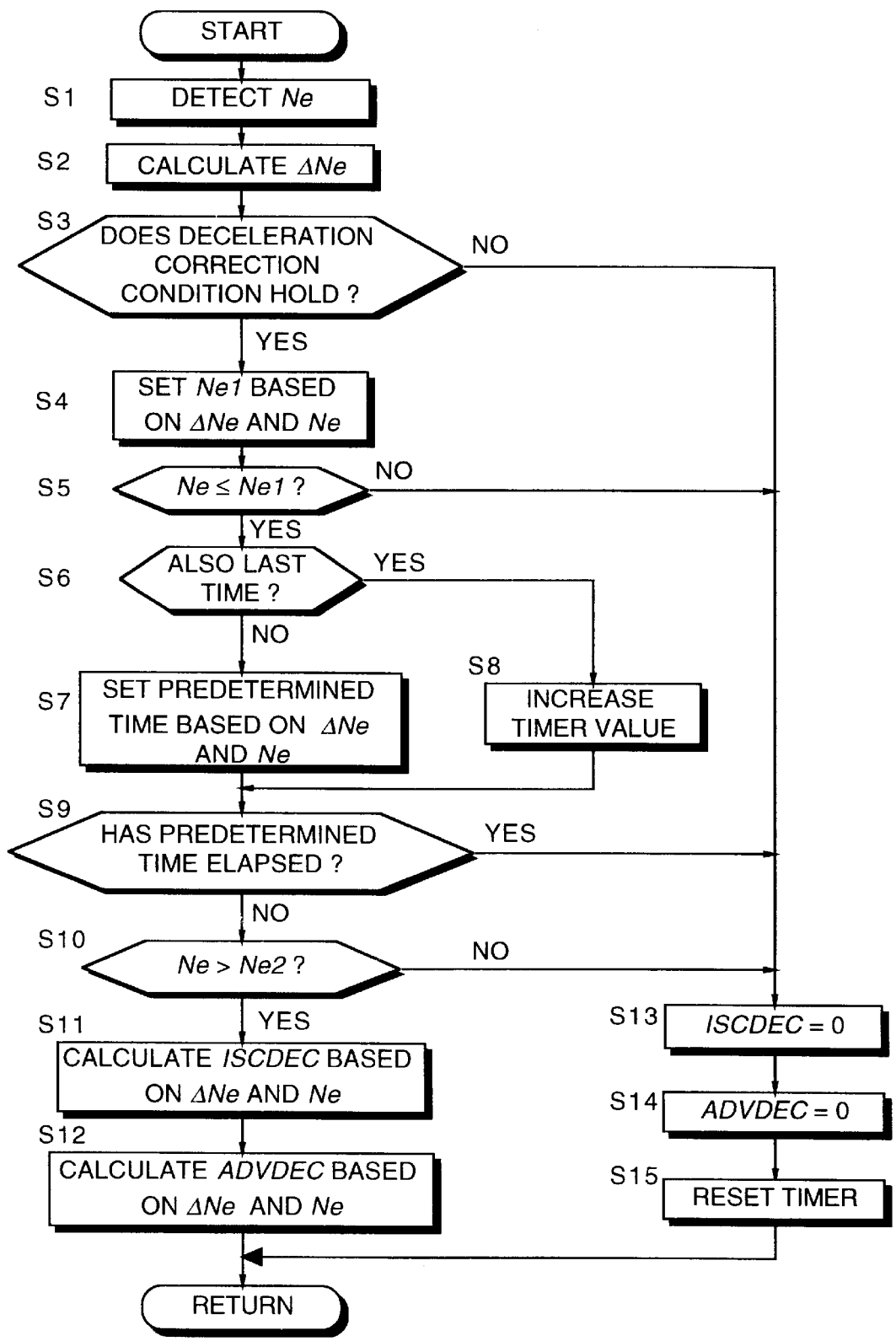
FIG. 2 is a flowchart describing a process for calculating an auxiliary air valve opening correction amount and an ignition timing correction amount performed by a control unit according to this invention.

A correction amount setting routine of FIG. 2 is performed at a regular interval.

In a step S1, the rotation speed Ne of the engine is calculated based on the signal from the crank angle sensor 11.

In a step S2, a deceleration $\Delta Ne$ is calculated from the engine rotation speed Ne and an engine rotation speed Ne(old) detected on the immediately preceding occasion that the routine was executed from the following equation (1).

$$\Delta Ne = Ne - Ne(\text{old}) \qquad (1)$$

In a step S3, it is determined whether or not a predetermined deceleration correction condition holds. This determination condition comprises at least the condition that the throttle opening TVO is 0.

When the deceleration correction condition does not hold, a correction amount ISCDEC of the opening of the auxiliary air valve 5 is set to 0 in a step S13, a correction amount ADVDEC of the ignition timing is set to 0 in a step S14, a timer described hereafter is reset in a step S15, and the routine is terminated.

On the other hand, when the deceleration correction condition holds in the step S3, the routine proceeds to a step S4.

In the step S4, a correction start engine rotation speed Ne1 is determined by looking up a map stored beforehand by the control unit 10, based on the deceleration $\Delta Ne$ and the engine rotation speed Ne.

The correction start engine rotation speed Ne1 is a threshold value to determine whether or not the correction of intake air amount and ignition timing are necessary. It is set to a larger value the larger the deceleration $\Delta Ne$.

In a step S5, the engine rotation speeds Ne is compared with the correction start engine rotation speed Ne1, and when the engine rotation speed Ne is equal to or less than the correction start engine rotation speed Ne1, the routine proceeds to a step S6.

When the engine rotation speed Ne is larger than the correction start engine rotation speed Ne1, the processing of the aforesaid steps S13–S15 is executed and the routine is terminated.

In a step S6, it is determined whether or not the same determination result was obtained on the immediately preceding occasion.

When the same determination result was obtained on the immediately preceding occasion, the routine proceeds to a step S8, and if the routine is passing via the step S6 for the first time, the routine proceeds to a step S7.

In the step S7, a predetermined time is set referring to another map stored beforehand by the control unit 10, based on the deceleration $\Delta Ne$ and engine rotation speed Ne. This predetermined time shows a continuation time limit for correction of the intake air amount and ignition timing. The predetermined time is set to be longer the larger the deceleration $\Delta Ne$.

After setting the predetermined time, the routine proceeds to a step S9.

When the routine has proceeded to the step S8 from the step S6, the timer value is incremented in the step S8 and the routine proceeds to a step S9.

In the step S9, it is determined whether or not the timer value is within a predetermined time range. If the timer value is within the predetermined time range, the routine proceeds to a step S10. If the timer value exceeds the predetermined time, the processing of the aforesaid steps S13–S15 is executed and the routine is terminated.

In the step S10, the engine rotation speed Ne is compared with a correction end rotation speed Ne2. This correction end rotation speed Ne2 is taken to be a fixed value smaller than the aforesaid correction start rotation speed Ne1.

When the engine rotation speed Ne is larger than the correction end rotation speed Ne2, the routine proceeds to steps S11 and S12.

In the step S11, an opening correction amount ISCDEC of the auxiliary air valve is calculated by looking up another map stored beforehand by the control unit 10, based on the deceleration $\Delta Ne$ and engine rotation speed Ne. The map is set so that the opening correction amount ISCDEC is larger the larger the deceleration $\Delta Ne$.

In the following step S12, an ignition timing advance correction ADVDEC is calculated by looking up another map stored beforehand by the control unit 10, based on the deceleration $\Delta Ne$ and engine rotation speed Ne.

The map is set so that the ignition timing advance correction ADVDEC becomes larger the larger the deceleration $\Delta Ne$, and the ignition timing advance correction ADVDEC becomes smaller as the engine rotation speed Ne falls.

After the correction amounts of the intake air amount and ignition timing are set in this way, the routine is terminated.

In the step S10, when the engine rotation speed Ne is equal to or less than the correction end rotation speed Ne2, the processing of the aforesaid steps S13–S15 is performed and the routine is terminated.

Figure 3:
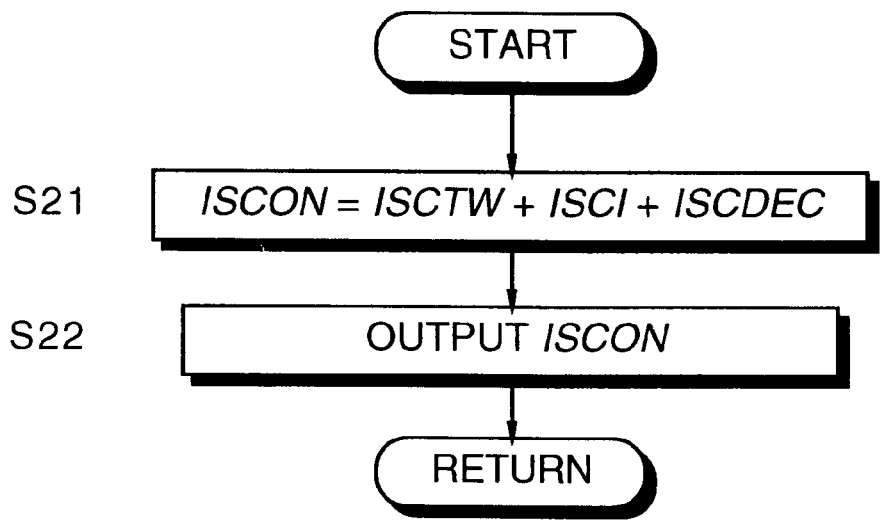
FIG. 3 is a flowchart describing a process for correcting an opening of the auxiliary air valve performed by the control unit.

The opening correction amount ISCDEC set in the steps S11 or S13 is used in the routine for correcting the opening of the auxiliary air valve shown by FIG. 3. This routine is performed at a regular interval.

In a step S21, an opening ISCON of the auxiliary air valve 5 is determined using the opening correction amount ISCDEC set in the steps S11 or S13 by the following equation (2).

$$ISCON = ISCTW + ISCI + ISCDEC \quad (2)$$

where, ISCTW=basic opening, and

ISCI=feedback correction amount.

In equation (2), the basic opening ISCTW is calculated referring to a map stored beforehand by the control unit 10 according to an engine cooling water temperature Tw.

The feedback correction amount ISCI is calculated as follows.

Specifically, when feedback control conditions hold for the idle rotation speed, a table which determines a target idle rotation speed Nset according to the engine cooling water temperature Tw is looked up, and the target idle speed Nset is set from the real water temperature Tw.

The real idle rotation speed Ne is compared with the target idle rotation speed Nset, and when Ne<Nset, the feedback correction amount ISCI is increased by a predetermined amount ΔI. Conversely, when Ne>Nset, the feedback correction amount ISCI is decreased by the predetermined amount ΔI.

The method of calculating the aforesaid basic opening and feedback correction amount is known for example from Tokkai Hei 10-115237 published by the Japanese Patent Office in 1998.

Here, it will be assumed that these values are calculated beforehand by another routine.

In addition to the above correction, various other increase corrections such as corrections due to the operation of an air-conditioner or radiator fan can be added to the equation (2).

In the step S22, the control unit 10 outputs a command signal corresponding to the opening ISCON thus determined to the auxiliary air valve 5.

Figure 4:
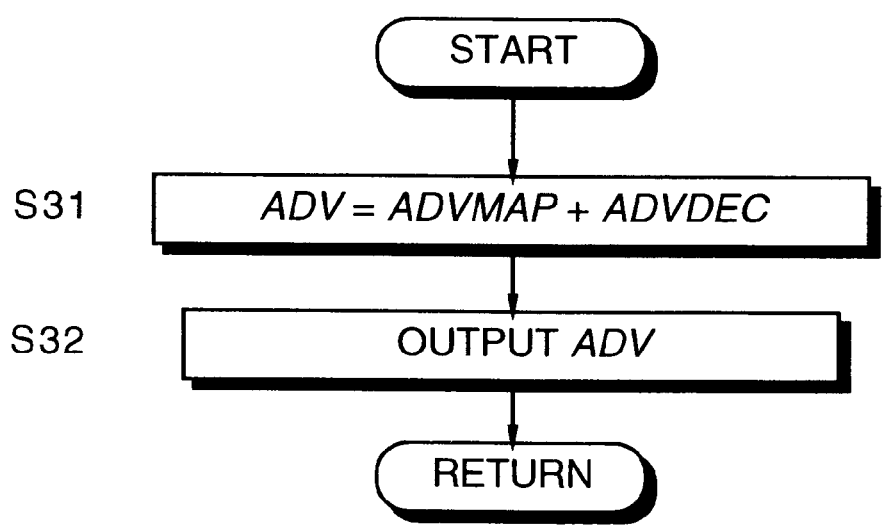
FIG. 4 is a flowchart describing a process for correcting the ignition timing performed by the control unit.

On the other hand, the ignition timing correction ADVDEC set in the steps S12 or S14 is used in a routine for correcting the ignition timing shown in FIG. 4.

This routine is performed at a predetermined rotating angle of the engine 1 corresponding to the ignition timing of the spark plug 8.

First, before performing this routine, the control unit 10 calculates a basic fuel injection amount Tp from the intake air flow rate Qa and engine rotation speed Ne by the following equation (3).

$$Tp = K \cdot Qa/Ne \quad (3)$$

where, K=constant.

The control unit 10 calculates a basic ignition timing ADVMAP by looking up a map which determines the basic ignition timing ADVMAP according to the engine rotation speed Ne and basic fuel injection amount Tp.

The method of calculating the basic ignition timing is known for example from U.S. Pat. No. 5,535,586.

Herein, the basic ignition timing ADVMAP is calculated beforehand by another routine.

In a step S31, an ignition timing ADV is determined by adding the ignition timing correction amount ADVDEC set in the steps S12 or S14 to the basic ignition timing ADVMAP. In addition, various other ignition timing correction amounts can be added.

In a step S32, an ignition command signal corresponding to the determined ignition timing ADV is output to the spark plug 8.

Figure 5:
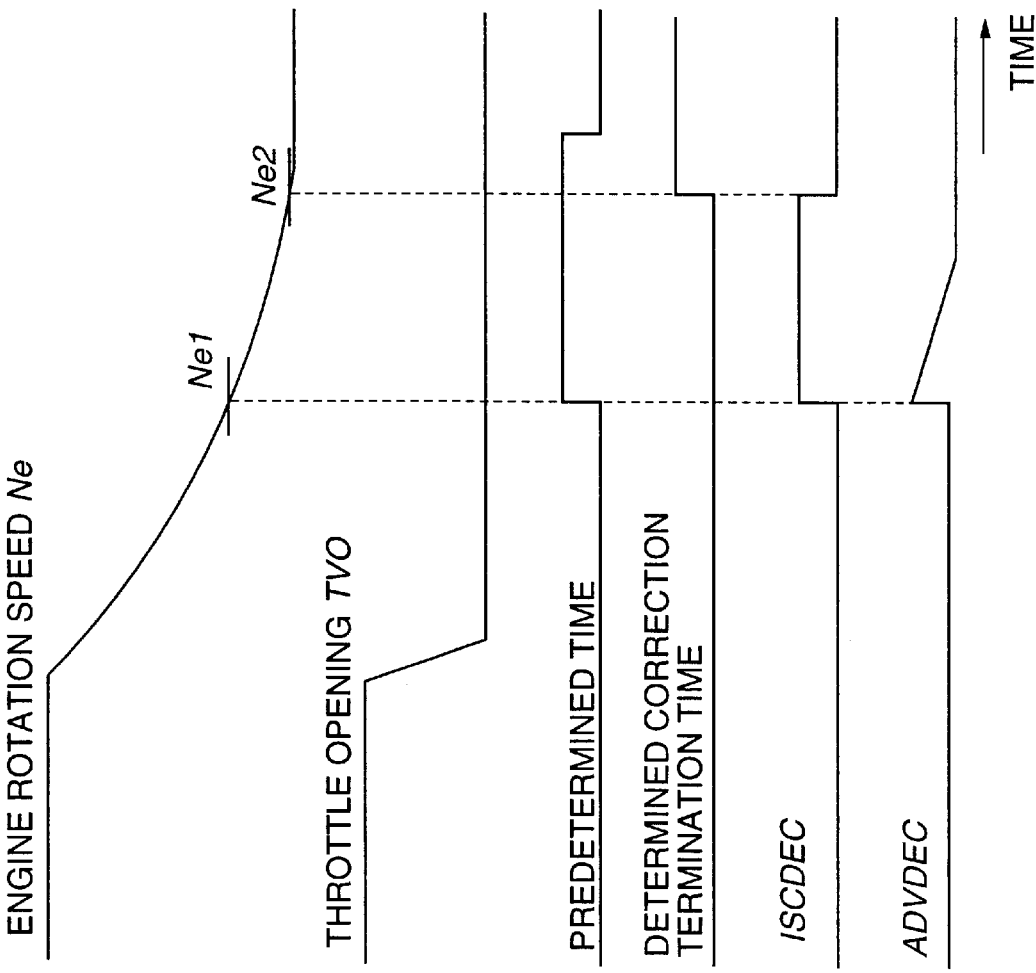
FIGS. 5A–5F are timing charts describing the results of control by the control unit.

As shown in FIG. 5B, when the throttle 3 is closed while the vehicle is running, the vehicle enters a deceleration state and the engine rotation speed Ne decreases.

As a result, fuel supply to the fuel injector 7 is cut by another routine.

When the engine rotation speed Ne decreases to the correction start rotation speed Ne1, air amount correction is begun, and an air amount equivalent to the opening correction amount ISCDEC is added to the air amount supply to the engine 1.

Here, the correction start rotation speed Ne1 is set to high speed and the opening correction amount ISCDEC is set large, the larger the deceleration ΔNe.

Fuel supply to the fuel injector 7 is renewed by another routine at effectively the same time or sligfhtly later than start of air amount correction.

On the other hand, the ignition timing correction is begun at the same time as start of air amount correction so as to compensate a response delay of the air amount correction.

As a result, the ignition timing is advance corrected for a period corresponding to the ignition timingcorrection amount ADVDEC. The ignition timing correction amount ADVDEC is set larger, the larger the deceleration ΔNe. It becomes smaller with subsequent decrease of engine rotation speed Ne as shown in FIG. 5F, and when the full effect of the air amount correction is accomplished, it is effectively 0.

This air amount correction and ignition timing correction prevent engine stall due to undershoot of the engine rotation speed when the engine rotation speed decreases to the idle rotation speed. Moreover, unnecessary rotation speed fluctuations of the engine 1 are suppressed more effectively than by the aforesaid prior art and the running stability of the engine 1 can be improved.

The air amount correction is terminated either when a correction time measured by the timer has elapsed as shown in FIG. 5C, or the engine rotation speed Ne reaches the correction end rotation speed Ne2 as shown by FIG. 5D, whichever is the sooner.

Figure 6:
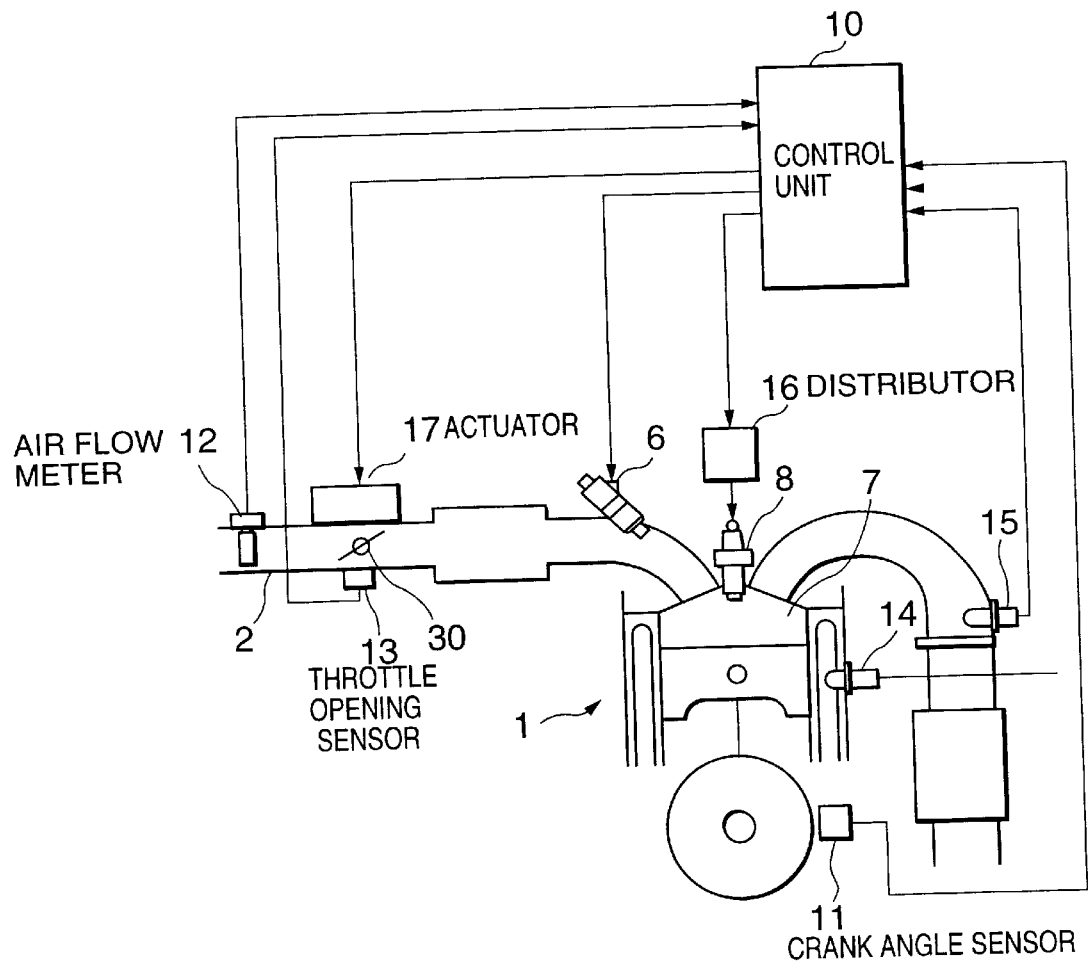
FIG. 6 is similar to FIG. 1 but showing another embodiment of this invention.

In this embodiment, the invention was applied to air amount correction of the engine 1 using the auxiliary air valve 5, but it may be applied also to an engine provides with an electric throttle 30 shown in FIG. 6.

That is, since the throttle 30 is directly controlled by an actuator 17, the opening of the throttle 30 is corrected via the actuator 17 to perform intake air amount correction.

The corresponding structures, materials, acts, and equivalents of all means plus function elements in the claims below are intended to include any structure, material, or acts for performing the functions in combination with other claimed elements as specifically claimed. The embodiments of this invention in which an exclusive property or privilege is claimed are defined as follows:

What is claimed:

1. A device for controlling an engine in a deceleration state, comprising:

a valve for increasing or decreasing an engine intake air amount;

a sensor for detecting an engine rotation speed; and a microprocessor programmed to:

calculate a deceleration of the engine from the engine rotation speed, set an opening increase correction amount of said valve according to the engine rotation speed and said engine deceleration, perform a correction of an opening of said valve based on said increase correction amount, and set said increase correction amount to be larger the larger said deceleration.

2. The deceleration controller as defined in claim 1, wherein said microprocessor is further programmed to start said correction of said valve opening when said engine rotation speed is equal to or less than a first predetermined rotation speed.

3. The deceleration controller as defined in claim 1, wherein said valve is an electronically controlled throttle.

4. A device for controlling an engine in a deceleration state, comprising:

a valve for increasing or decreasing an engine intake air amount;

a sensor for detecting an engine rotation speed; and a microprocessor programmed to:

calculate a deceleration of the engine from the engine rotation speed, set an opening increase correction amount of said valve according to the engine rotation speed and said engine deceleration, perform a correction of an opening of said valve based on said increase correction amount, start said correction of said valve opening when said engine rotation speed is equal to or less than a first predetermined rotation speed, and terminate said correction of said valve opening when said engine rotation speed has decreased to a second predetermined rotation speed which is less than said first predetermination rotation speed, or when a predetermined time has elapsed from when said correction of said valve opening was started, whichever timing is the sooner.

5. A deceleration controller as defined in claim 4, wherein said microprocessor is further programmed to set said predetermined time to be longer the larger said deceleration.

6. A device for controlling an engine in a deceleration state, comprising:

a valve for increasing or decreasing an engine intake air amount;

a sensor for detecting an engine rotation speed; and a microprocessor programmed to:

calculate a deceleration of the engine from the engine rotation speed, set an opening increase correction amount of said valve according to the engine rotation speed and said engine deceleration, perform a correction of an opening of said valve based on said increase correction amount, start said correction of said valve opening when said engine rotation speed is equal to or less than a first predetermined rotation speed, and set said first predetermined rotation speed to a larger value the larger said deceleration.

7. A device for controlling an engine in a deceleration state, comprising:

a valve for increasing or decreasing an engine intake air amount;

a sensor for detecting an engine rotation speed; and a microprocessor programmed to:

calculate a deceleration of the engine from the engine rotation speed, set an opening increase correction amount of said valve according to the engine rotation speed and said engine deceleration, and perform a correction of an opening of said valve based on said increase correction amount, wherein said engine comprises a spark plug for igniting a fuel-air mixture, and said microprocessor is further programmed to advance an ignition timing of said spark plug in response to said correction of said valve opening.

8. A deceleration controller as defined in claim 7, wherein said microprocessor is further programmed to set an advance amount of said ignition timing to be larger, the larger said deceleration.

9. A deceleration controller as defined in claim 7, wherein said microprocessor is further programmed to decrease an advance amount of said ignition timing as said engine rotation speed decreases.

10. A device for controlling an engine in a deceleration state, comprising:

a valve for increasing or decreasing an engine intake air amount;

a sensor for detecting an engine rotation speed; and a microprocessor programmed to:

calculate a deceleration of the engine from the engine rotation speed, set an opening increase correction amount of said valve according to the engine rotation speed and said engine deceleration, and perform a correction of an opening of said valve based on said increase correction amount, wherein said valve is an auxiliary air valve which bypasses a throttle of the engine.

11. A device for controlling an engine in a deceleration state, comprising:

a valve for increasing or decreasing an engine intake air amount, means for detecting an engine rotation speed, means for calculating a deceleration of the engine from the engine rotation speed, means for setting an opening increase correction amount of said valve according to the engine rotation speed and said engine deceleration, and means for performing a correction of an opening of said valve based on said increase correction amount.

\* \* \* \* \*